United States Patent
Watanabe et al.

(10) Patent No.: US 6,646,861 B1
(45) Date of Patent: Nov. 11, 2003

(54) GAS INSULATED SWITCHGEAR

(75) Inventors: Hiroyasu Watanabe, Hitachi (JP); Rei Henmi, Hitachi (JP); Ryouichi Shinohara, Hitachi (JP); Ryouichi Mitsugi, Hitachi (JP); Shunji Ito, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/069,724

(22) PCT Filed: May 9, 2002

(86) PCT No.: PCT/JP00/02086

§ 371 (c)(1),
(2), (4) Date: Mar. 31, 2000

(87) PCT Pub. No.: WO01/76032

PCT Pub. Date: Oct. 11, 2001

(51) Int. Cl.[7] .................................................. H02B 1/20
(52) U.S. Cl. ........................................ 361/612; 361/618
(58) Field of Search ................................ 361/601–605, 361/611–612, 618, 620, 624, 631, 634; 218/43–84, 152–158

(56) References Cited

U.S. PATENT DOCUMENTS

| 4,752,860 A | * | 6/1988 | Romanet et al. ............ 361/618 |
| 4,899,250 A | * | 2/1990 | Itai .............................. 361/618 |
| 5,200,881 A | * | 4/1993 | Itai .............................. 361/618 |

FOREIGN PATENT DOCUMENTS

| JP | 57-93018 | 6/1982 |
| JP | 61-92106 | 5/1986 |
| JP | 3-39310 | 4/1991 |
| JP | 6-121421 | 4/1994 |
| JP | 8-47125 | 2/1996 |

* cited by examiner

*Primary Examiner*—Gregory Thompson
(74) *Attorney, Agent, or Firm*—Mattingly, Stanger & Malur, P.C.

(57) ABSTRACT

In a gas-insulated switching device capable of reducing the physical installation space while suppressing the installation height of the device, busbar connecting lines are disposed perpendicularly to and between as pair of main busbars to connect the main busbars. Three sets (one set per phase) of three serially connected horizontal broker units are placed in parallel, and each of the main busbars has three busbar units along a portion extending vertically from the end of the busbar connecting line.

11 Claims, 8 Drawing Sheets

GAS INSULATED SWITCHGEAR

FIELD OF INVENTION

The present invention relates to a gas-insulated switching device for an electric station such as a power plant and a switching station.

BACKGROUND OF THE INVENTION

A well-known conventional gas-insulated switching apparatus is disclosed by Japanese Utility Model Right Publication No. H 03-39310 (1991). This gas-insulated switching apparatus is of a 1+½-switch arrangement in which oppositely-disposed parallel busbar connecting lines are arranged perpendicularly to the busbars. Busbar units of three phases constituting the main busbars are arranged almost in parallel in the side outer than the ends of the connecting lines.

To reduce the installation space of said gas-insulated switching device, for example, Japanese Application Patent Laid-Open Publication No. Hei 08-47125 discloses a vertically-placed breaker units which constitute the connecting lines. However, this configuration makes the gas-insulated switching device taller but less earthquake-resistant. Therefore, the gas-insulated switching device of this type may not be installed in a height-limited location. In other words, the gas-insulated switching device of this type is not available to an indoor plant or an underground substation.

SUMMARY OF THE INVENTION

A representative object of the present invention is to reduce the installation space without increasing its height.

The basic features of the present invention are that three horizontal breaker units are connected in series by the connecting lines each of which is disposed perpendicularly to the main oppositely-disposed busbars and that each of the mains has busbar units of three phases along a portion (stud) rising from the end of each busbar connecting line.

In the description of the present invention, the end of each busbar connecting line means the end of a circuit block near the main busbar in the breaker units which are located at both ends of the busbar connecting line. More concretely, it means the end of the enclosure of an airtight container constituting the power breaker block towards the main busbar. The horizontal power breaker unit is a power breaker unit whose airtight container constituting the power breaker block is placed horizontally, that is, the central axis of the airtight container is horizontal and electric contacts in the airtight container are horizontally separated.

The stud rising from the end of the busbar connecting line comprises a busbar connecting unit and is connected to the enclosure of the airtight container facing to the busbar. The busbar unit constituting the main busbar is placed oppositely to the main busbar of the busbar connecting unit or in the side of the main busbar connecting unit. A plurality of busbar connecting lines can be placed along the main busbar.

The present invention can suppress the physical height of the gas-insulated switching device as the busbar connecting lines are constituted by horizontal power breaker units. Further, the disposition of the busbar units along the studs which rise from the end of the busbar connecting lines can reduce the dimensions perpendicular to the main busbars of the gas-insulated switching device and consequently the installation space of the gas-insulated switching device.

For connection of the adjacent power breaker units, parts stand upright from the ends of the power breaker units. In other words, power breaker units are connected by a breaker connecting unit which comprises two vertical parts rising from the ends of the adjacent power breaker units and a horizontal part connecting these vertical parts. "The end of a power breaker unit" means the end of the enclosure of the airtight container constituting the breaker block of the power breaker unit. Further, "the adjacent power breaker units" means the adjoining two of three power breaker units which are connected in series.

In accordance with the present invention, the power breaker units are connected by means which rise upright from the end of the breaker units. In other words, the power breaker units are connected by a breaker connecting unit comprising vertical and horizontal units. Therefore, the distance between the adjacent power breaker units can be reduced. This can further reduce the installation space of the gas-insulated switching device.

Basically, a line leader line is vertically connected to a part (or a breaker connecting unit) between the adjacent power breaker units. Only one leader line is connected to one breaker connecting unit. In some cases (particularly when the leader line comprises a main and auxiliary lines), two leader lines can be connected thereto. In such a case, one of the vertically drawn-out leader lines is drawn out horizontally so as to be perpendicular to the other leader line. Or one of two leader lines is drawn out between respective busbar connecting lines. For example, one of the leader lines 35 for the first phase is drawn to a place between the first and second phases and one of the leader lines for the second and third phases are drawn to places between the second and third phases. There are two ways of drawing one of two leader lines away from the other leader line: drawing the leader line slantwise along the main busbar and drawing the leader line in parallel to the man busbar and then towards (perpendicular to) the main busbar.

In accordance with the present invention, when two leader lines are simultaneously drawn from the adjacent power breaker units or a breaker connecting unit, one of two vertically-drawn leader lines is drawn horizontally away from the other leader line or horizontally to a place between phases of the busbar connecting lines. Therefore, two leader lines can be simultaneously drawn from between the adjacent power breaker units. This can reduce the distance between two opposite busbars of the gas-insulated switching device.

Further, a transformer unit is connected to a portion between the adjacent power breaker units, or the stud of the breaker connecting units. To suppress the power breaker unit from increasing the physical height of the gas-insulated switching device, this invention disposes the transformer unit in a space between two studs on the ends of the enclosure of the airtight container which constitutes the breaker unit of the power breaker unit.

DESCRIPTION OF THE PREFERRED EMBODIMENTS (Embodiment 1)

Figure 1:
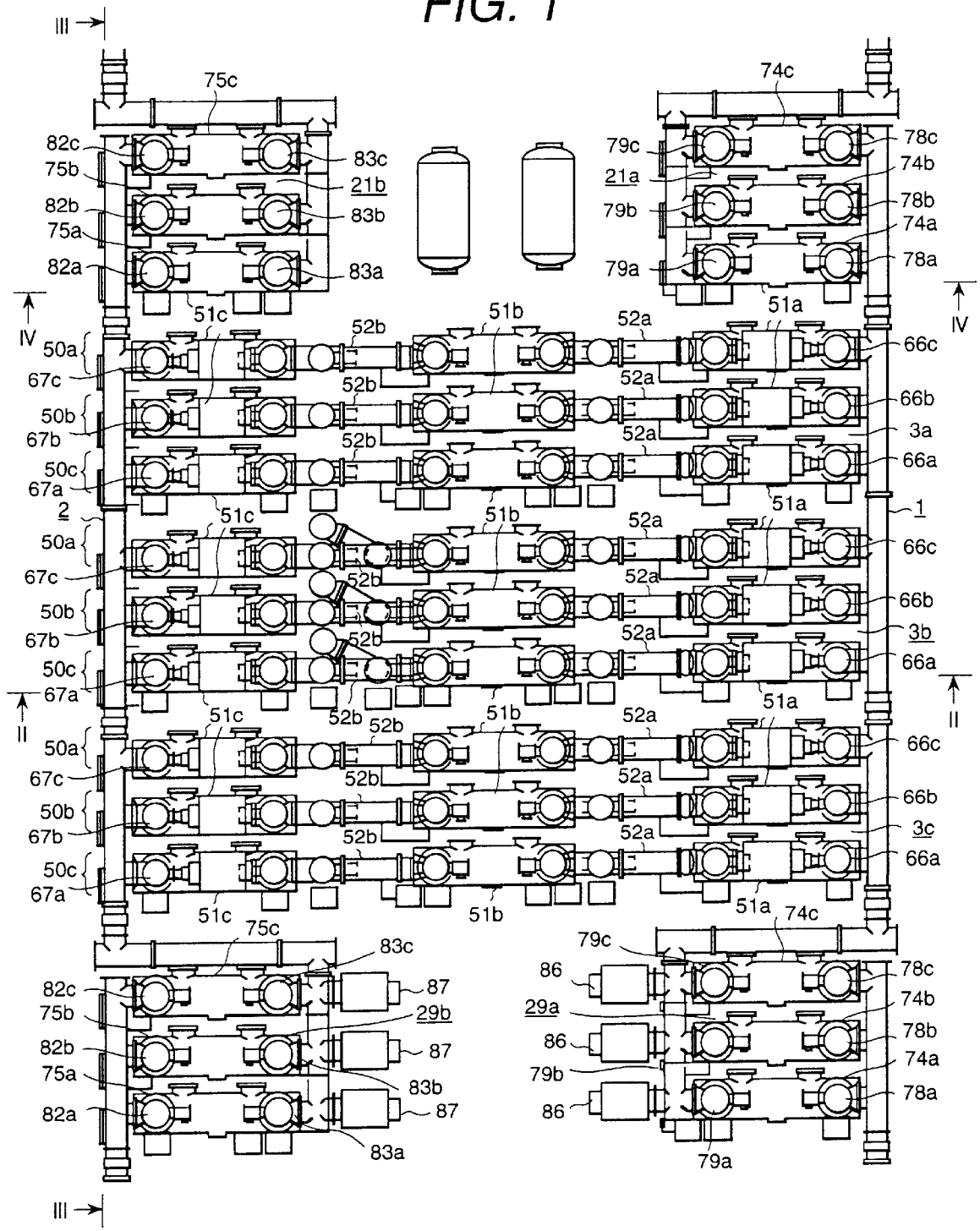
FIG. 1 shows a plan view of the layout of components of a gas-insulated switching device which is a first embodiment of the present invention.
Figure 2:
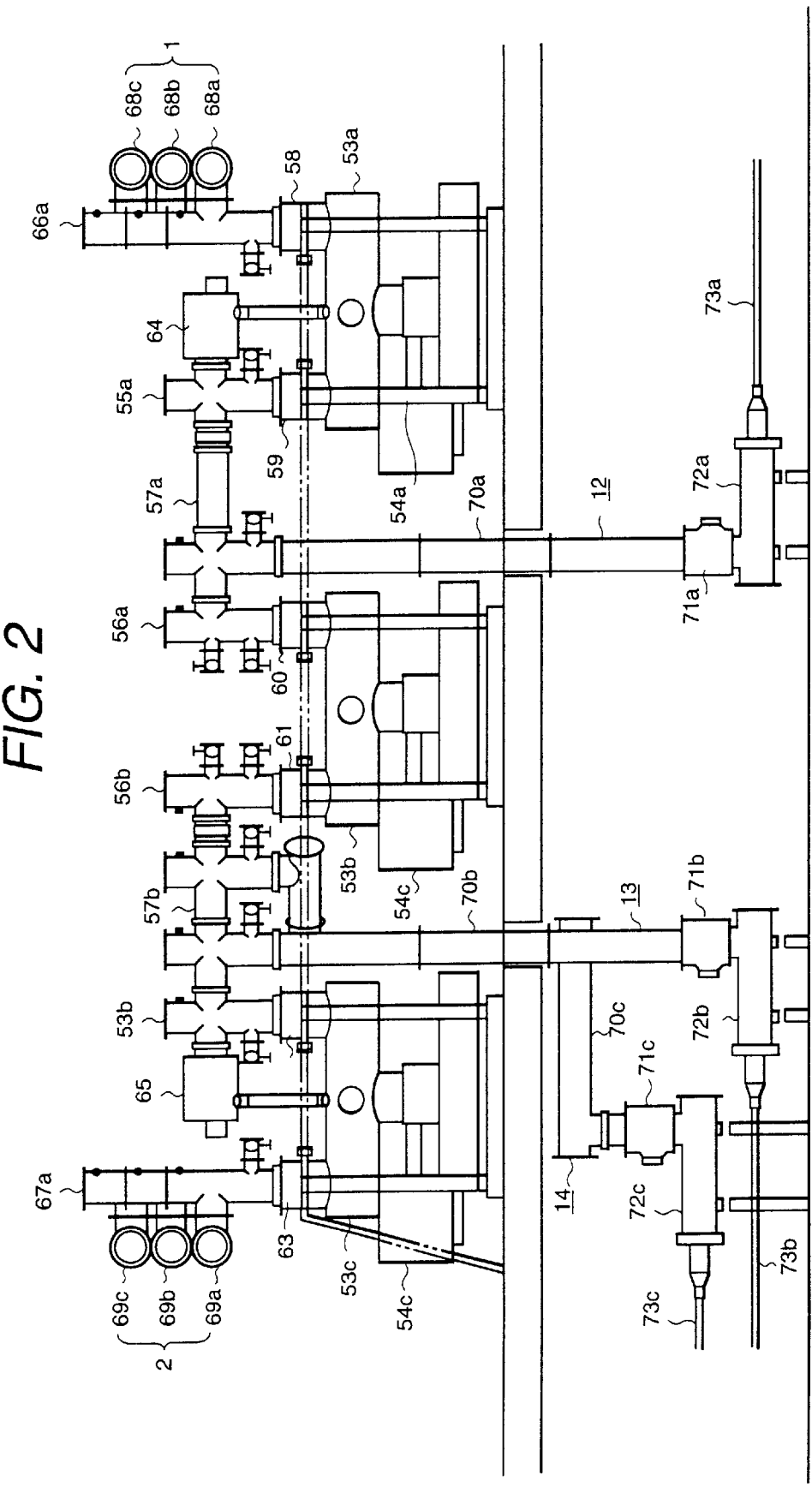
FIG. 2 is a plan view taken on line II—II of FIG. 1.
Figure 3:
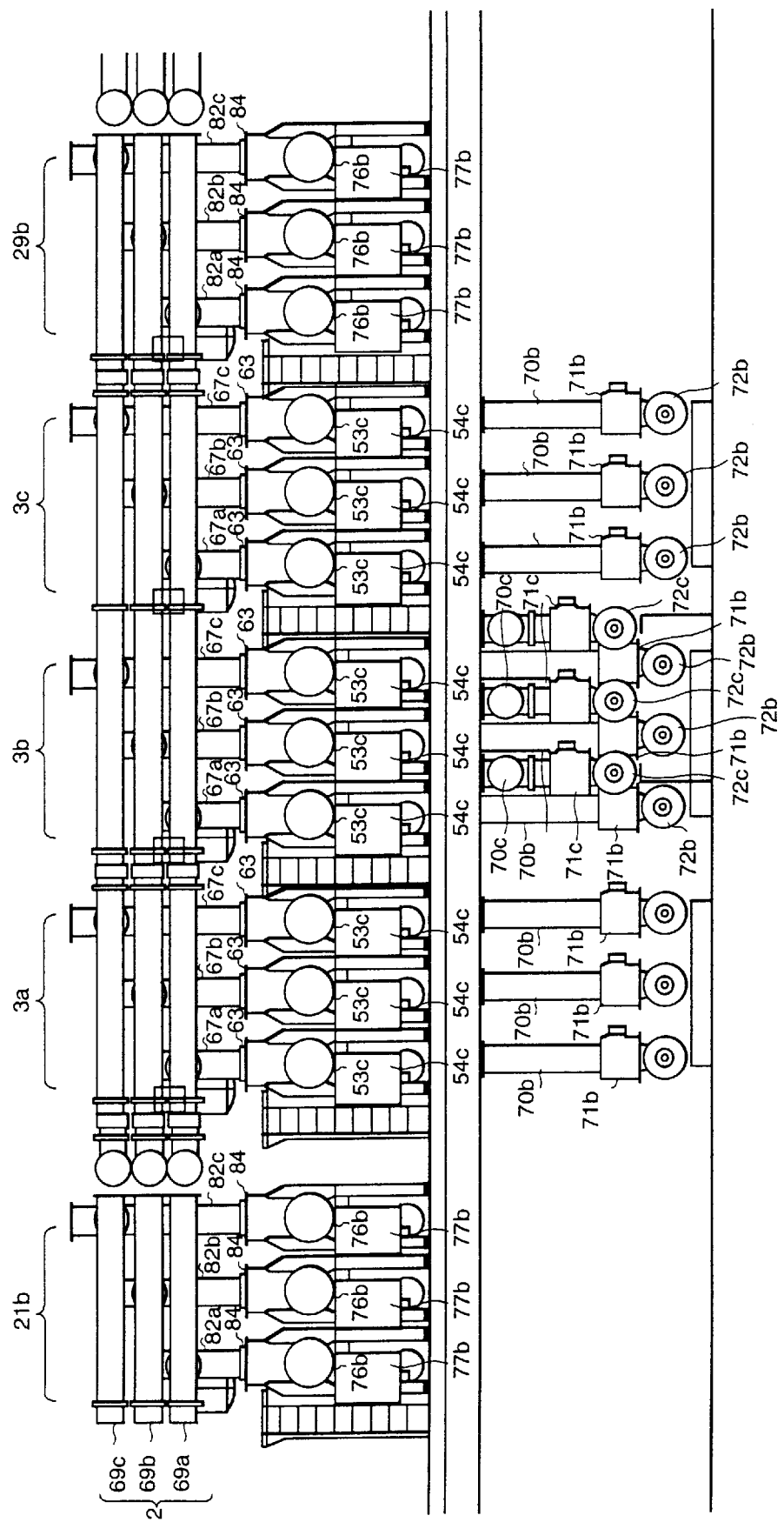
FIG. 3 is a plan view taken on line III—III of FIG. 1.
Figure 4:
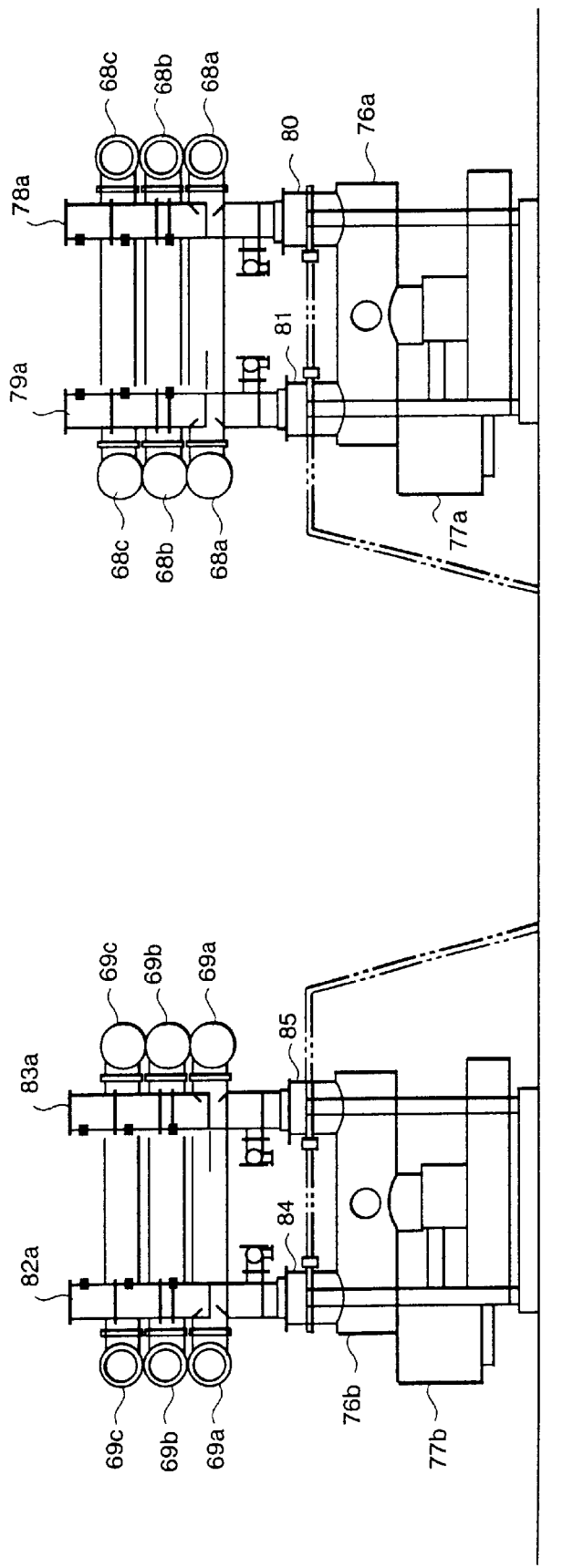
FIG. 4 is a plan view taken on line IV—IV of FIG. 1.
Figure 5:
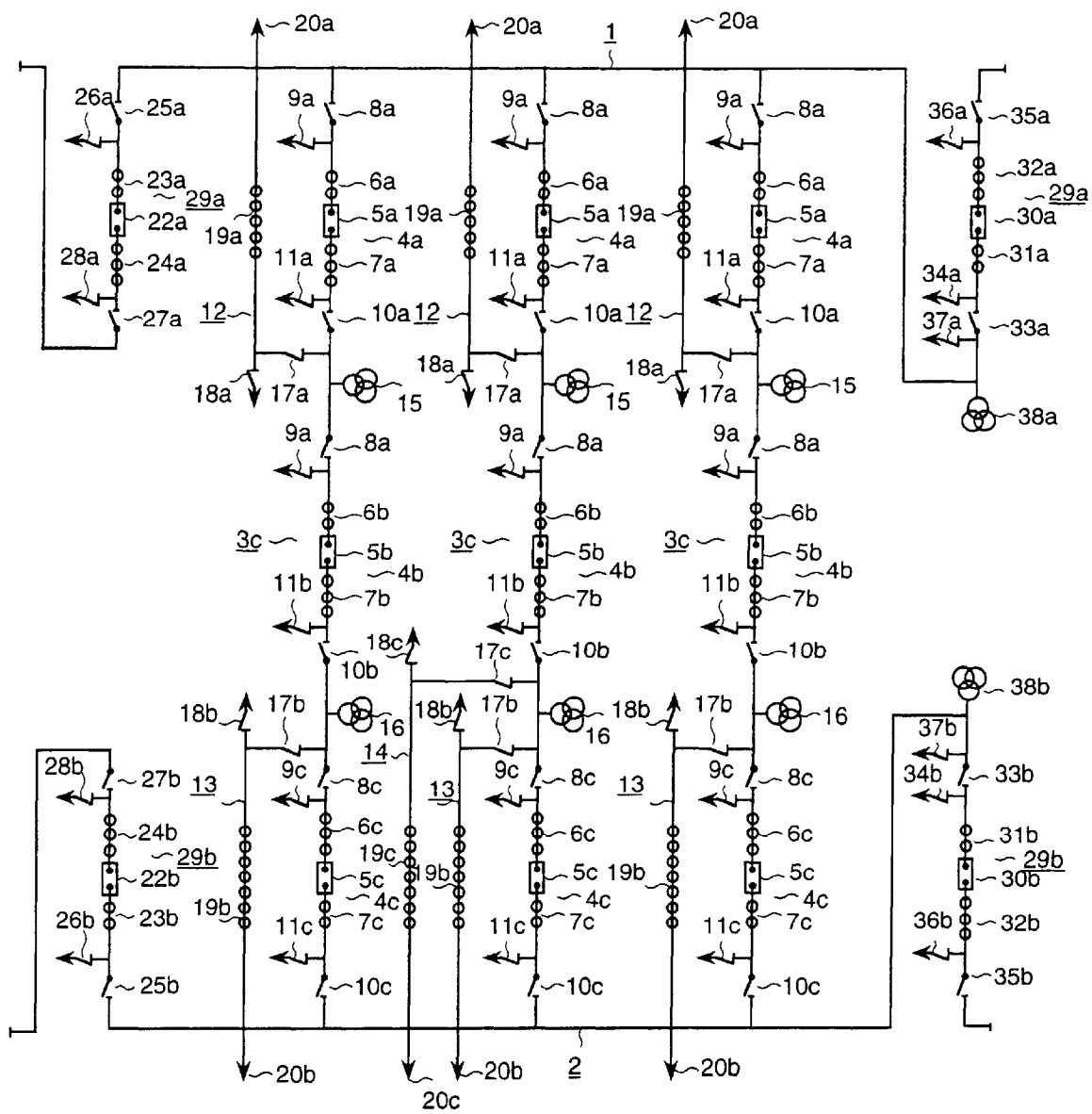
FIG. 5 is a single connection diagram of a gas-insulated switching device of FIG. 1.

Referring to FIG. 1 to FIG. 5, the first embodiment of the present invention will be explained below. FIG. 5 shows a schematic diagram of a gas-insulated switching device which is a first embodiment of the present invention. This embodiment is of a 1+½-switch arrangement. The main busbars 1 and 2 dual busbars are connected with busbar connecting lines 3a to 3c. These lines 3a to 3c consist of serially-connected unit lines 4a to 4c.

The unit line 4a comprises a breaker 5a having a transformer 6a, a disconnecting switch 8a, and a rounding switch 9a at one end of the breaker 5a and a current transformer 7a, a disconnecting switch 10a, and a grounding switch 11a at the other end of the breaker 5a. The unit line 4b comprises a breaker 5b having a transformer 6b, a disconnecting switch 8b, and a grounding switch 9b at one end of the breaker 5b and a current transformer 7b, a disconnecting switch 10b, and a rounding switch 11b at the other end of the breaker 5b.

The unit line 4c comprises a breaker 5c having a transformer 6c, a disconnecting switch 8c, and a grounding switch 9c at one end of the breaker 5c and a current transformer 7c, a disconnecting switch 10c, and a rounding switch 11c at the other end of the breaker 5c. A leader line 12 and a transformer 15 are connected between the unit lines 4a and 4b. A leader line 13 and a transformer 16 are connected between the unit lines 4b and 4c. Further a leader line 14 is connected between the unit lines 4b and 4c of the busbar connecting line 3b. Leader lines 13 and 14 connected between the unit lines 4b and 4c for the busbar connecting line 3b constitute main and auxiliary lines.

The leader line 12 comprises a breaker 17a, a grounding switch 18a, a current transformer 19a and a cable head 20a.

The leader line 13 comprises a breaker 17b, a grounding switch 18b, a current transformer 19b and a cable head 20b. The leader line 14 comprises a breaker 17c, a grounding switch 18c, a current transformer 19c and a cable head 20c.

A power receiving line 21a and the busbar partitioning line 29a are connected to the main busbar 1. The power receiving line 21a comprises a power breaker 22a, a set of a current transformer 23a, a disconnecting switch 25a, and a grounding switch 26a which are connected to one end of the power breaker 22a, a set of a current transformer 24a, a disconnecting switch 27a, and a grounding switch 28a which are connected to the other end of the power breaker 22a. The busbar partitioning line 29a comprises a power breaker 30a, a set of a current transformer 31a, a disconnecting switch 33a, a grounding switch 34a, a grounding switch 37a and a transformer 38a which are connected to one end of the power breaker 30a, a set of a current transformer 32a, a disconnecting switch 35a, and a grounding switch 36a which are connected to the other end of the power breaker 30a.

A power receiving line 21b and the busbar partitioning line 29b are connected to the main busbar 2. The power receiving line 21b comprises a power breaker 22b, a set of a current transformer 23b, a disconnecting switch 25b, and a grounding switch 26b which are connected to one end of the power breaker 22b, a set of a current transformer 24b, a disconnecting switch 27b, and a grounding switch 28b which are connected to the other end of the power breaker 22b. The busbar partitioning line 29b comprises a power breaker 30b, a set of a current transformer 31b, a disconnecting switch 33b, a grounding switch 34b, a grounding switch 37b and a transformer 38b which are connected to one end of the power breaker 30b, a set of a current transformer 32b, a disconnecting switch 35b, and a grounding switch 36b which are connected to the other end of the power breaker 30b.

The power receiving lines 21a and 21b receive power from an upstream power system or an adjoining gas-insulated switching device, send it to the busbar connecting lines 3a to 3c via the main busbars 1 and 2, then to a downstream power system via the line leader lines 12 to 14.

Further, power is sent to the busbar partitioning lines 29a and 29b via the main busbars 1 and 2, and then to the adjoining gas-insulated switching device.

FIG. 1 to FIG. 4 show the layout of components of an actual gas-insulated switching device to which the circuit configuration of FIG. 5 is applied. The gas-insulated switching device of this embodiment is designed to be installed in an indoor substation and supply power to a downstream power system via cables. The indoor substation is made up with a ground section and an underground section. The ground section comprises major components constituting the gas-insulated switching device and the underground section contains a cable section for supplying power to a downstream power system.

The main busbars 1 and 2 are oppositely disposed in parallel to each other. The busbar connecting lines 3a to 3c which connect the busbars 1 and 2 are disposed in parallel to each other and perpendicularly to the busbars 1 and 2 therebetween. The busbar connecting lines 3a to 3c comprise single-phase lines 50a to 50c which are disposed in parallel to each other along the main busbars 1 and 2. The single-phase lines 50a to 50c are composed of breaker units 51a to 51c.

The power breaker units 51a and 51b are connected to each other with a breaker connecting unit 52a and the breaker units 51b and 51c are connected to each other with a breaker connecting unit 52b. In other words, the breaker units 51a, 51b, and 51c are connected in series by means of the breaker connecting units 52a and 52b. The breaker connecting unit 51a is a power breaker 5a and comprises a breaker section 53a and an operator 54a. The breaker connecting unit 51b is a power breaker 5b and comprises a breaker section 53b and an operator 54b. The breaker connecting unit 51c is a power breaker 5c and comprises a breaker section 53c and on operator 54c.

The breaker sections 53a to 53c houses electric contacts in a cylindrical tank in which sulfur hexafluoride $SF_6$ (insulating medium) is hermetically sealed. These electric contacts are mechanically connected to the corresponding operators 54a to 54c by means of link mechanisms to be horizontally opened by the operators 54a to 54c. The operators 54a to 54c are respectively located on the lower left ends of the corresponding breaker sections 53a to 53c. Each of the cylindrical tanks of the breaker sections 53a to 53c is a horizontal grounded metallic airtight container whose longitudinal central axis is in parallel to the ground. The cylindrical tanks of the breaker sections 53a to 53c are placed in a plane so that their longitudinal central axes may be aligned. This embodiment suppresses the height of each breaker unit by using a horizontal cylindrical tank. The tank to be hereinafter explained is what is explained above, that is, the tank is a horizontal grounded metallic airtight container filled with $SF_6$.

The breaker connecting units 52a and 52b stand upright from the adjoining breaker units to connect the breaker units. The breaker connecting unit 52a comprises upright sections 55a and 56a and a horizontal section 57a which connects these upright sections 55a and 56a to level. The breaker connecting unit 52b comprises upright sections 55b and 56b and a horizontal section 57b which connects these upright sections 55b and 56b to level.

The upright section 55a consists of a cross-shaped branch type tank which contains a disconnecting switch 10a and a grounding switch 11a) and is mounted on the further end (with respect to the main busbar 1a) of the tank enclosure of the breaker section 53a by means of a current transformer unit 59 which is a cylindrical tank containing a current transformer 7a.

A current transfer unit 64 is connected to the upright section 55a at the side closer to the main busbar and has a transformer 15 in a cylindrical tank. The current transfer unit 64 is placed in a space between the upright section 55a and the busbar connecting units 66a to 66c. The upright section 56a is a T-shaped branch type tank which contains a disconnecting switch 8b and a grounding switch 9b and is mounted on the tank enclosure of the breaker 53b at the end closer to the breaker 53a by means of a current transformer unit 60. The current transformer unit 60 is a cylindrical tank containing a current transformer 6b. The horizontal section 57a comprises a cross-shaped branch tank which contains a disconnecting switch 17a and a grounding switch 18a and a cylindrical tank which contains a connecting busbar.

The upright section 55b is a T-shaped branch type tank which contains a disconnecting switch 8c and a grounding switch 9c and is mounted on the tank enclosure of the breaker 53c at the further end (with respect to the main busbar 1b by means of a current transformer unit 62. The current transformer unit 62 is a cylindrical tank containing a current transformer 6c. The current transformer unit 65 is connected to the upright section 55b at the side closer to the main busbar 1b. The transformer unit 65 comprises a cylindrical tank containing a transformer 16 and is placed in a place between the upright section 55b and the busbar connecting units 67a to 67c to be explained later. The upright section 56b is a T-shaped branch type tank which contains a disconnecting switch 10b and a grounding switch 11b and is mounted on the tank enclosure of the breaker 53b at the end closer to the breaker 53c by means of a current transformer unit 61. The current transformer unit 61 is a cylindrical tank containing a current transformer 7b.

As for the busbar connecting lines 3a and 3c, the horizontal section 57b comprises a cross-shaped branch tank which contains a disconnecting switch 17b and a grounding switch 18b and a cylindrical tank which contains a connecting busbar. As for the busbar connecting lines 3b, the horizontal section 57b comprises a cross-shaped branch tank which contains a disconnecting switch 17b and a grounding switch 18b and a cross-shaped branch tank which contains a disconnecting switch 17c and a grounding switch 18c. The horizontal sections 57a and 57b are disposed on a plane.

A busbar connecting unit 66a is mounted on the tank enclosure of the breaker section 53a which constitutes the breaker unit 51a of the single-phase line 50a at the end closer to the main busbar 1a by means of the current transformer 58. A busbar connecting unit 66b is mounted on the tank enclosure of the breaker section 53a which constitutes the breaker unit 51a of the single-phase line 50b at the end closer to the main busbar 1a by means of the current transformer 58. A busbar connecting unit 66c is mounted on the tank enclosure of the breaker section 53a which constitutes the breaker unit 51a of the single-phase line 50c at the end closer to the main busbar 1a by means of the current transformer 58. Each of the busbar connecting units 66a to 66c accommodates a disconnecting switch 8a, a grounding switch 9a, and a connecting busbar in a cylindrical tank standing upright from the end of the tank enclosure.

A busbar connecting unit 67a is mounted by means of the current transformer unit 63 on the tank enclosure of the breaker section 53c (which constitutes the breaker unit 51c of the single-phase line 50a) at the end closer to the main busbar 1b. The current transformer unit 63 has a current transformer 7c in a cylindrical tank. A busbar connecting unit 67b is mounted by means of the current transformer unit 63 on the tank enclosure of the breaker section 53c (which constitutes the breaker unit 51c of the single-phase line 50b) at the end closer to the main busbar 1b. A busbar connecting unit 67c is mounted by means of the current transformer unit 63 on the tank enclosure of the breaker section 53c (which constitutes the breaker unit 51c of the single-phase line 50c) at the end closer to the main busbar 1b. Each of the busbar connecting units 67a to 67c accommodates a disconnecting switch 10c, a grounding switch 11c, and a connecting busbar in a cylindrical tank standing upright from the end of the tank enclosure.

The main busbar 1 comprises basbar units 68a to 68c each of which has a busbar conductor in a cylindrical tank and is placed in the outside of the main busbar 1 and 2 (opposite to the busbar connecting units 66a to 66c). The busbar units 68a to 68c are vertically disposed along the busbar connecting units 66a to 66c. The busbar unit 68a is connected to the busbar connecting unit 66a. The busbar unit 68b is connected to the busbar connecting unit 66b. The busbar unit 68c is connected to the busbar connecting unit 66c.

The main busbar 2 comprises basbar units 698a to 69c each of which has a busbar conductor in a cylindrical tank and is placed in the outside of the main busbar 1 and 2 (opposite to the busbar connecting units 67a to 67c). The busbar units 69a to 69c are vertically disposed along the busbar connecting units 67a to 67c. The busbar unit 69a is connected to the busbar connecting unit 67a. The busbar unit 69b is connected to the busbar connecting unit 67b. The busbar unit 69c is connected to the busbar connecting unit 67c.

This embodiment disposes the busbar connecting units 66a to 66c (67a to 67c) and the busbar units 68a to 68c (69a to 69c) across the main busbar 1 and 2, but they can be in the same side with respect to the main busbar 1 and 2.

The leader line 12 consists of a connecting busbar unit 70a, a current transformer unit 71a, and a cable head unit 72a. The connecting busbar unit 70a has a connecting busbar in a cylindrical tank, is connected to the cross-shaped branch tank which constitutes the horizontal section 57a of the breaker connection unit 52a, and goes down vertically.

The current transformer unit 71a has a current transformer 19a in a cylindrical tank. The cable head unit 72a has a cable head 20a which is connected to the cable 73a in a cylindrical tank.

The leader line 13 consists of a connecting busbar unit 70b, a current transformer unit 71b, and a cable head unit 72b. The connecting busbar unit 70b has a connecting busbar in a cylindrical tank, is connected to the cross-shaped branch tank which constitutes the horizontal section 57b of the breaker connection unit 52b, and goes down vertically. The current transformer unit 71b has a current transformer 19b in a cylindrical tank. The cable head unit 72b has a cable head 20a which is connected to the cable 73b in a cylindrical tank.

The leader line 14 consists of a connecting busbar unit 70c, a current transformer unit 71c, and a cable head unit 72c. The connecting busbar unit 70c has a current transformer 19c in a cylindrical tank and is connected to the cross-shaped branch tank (different from the cross-shaped branch tank to which the connecting busbar unit 70b is connected) which constitutes the horizontal section 57b of the breaker connection unit 52b of the busbar connecting line 3b. The current transformer unit 71c has a current transformer 19c in a cylindrical tank. The cable head unit 72c has a cable head 20c which is connected to the cable 73c in a cylindrical tank.

The connecting busbar unit 70c cannot go down vertically because the operator 54b of the breaker unit 51b which constitutes the busbar connecting line 3b is in its way. Even if the connecting busbar unit 70c is vertically drawn down, the cable 73c cannot be drawn out because the leader line 13 is in its way.

To solve this problem, this embodiment horizontally to the side of the connecting busbar unit 70c slantwise along the main busbar 2, and then vertically draws the connecting busbar unit 70c along the connecting bus unit 70b.

If the cable head unit 72c of the leader line 14 is disposed next to the cable head unit 72b of the leader line 13 in an identical position, the phase-to-phase distance of respective single-phase lines 50a to 50c which constitutes the busbar connecting line 3b must be made greater to secure an insulating distance between the cable head units 72b and 72c. However, this increases the physical installation space of the gas-insulated switching device.

To secure an insulating distance between the cable head units 72b and 72c without increasing the phase-to-phase distance of respective single-phase lines 50a to 50c, this embodiment horizontally draws the vertical connecting busbar unit 70c apart from the leader line 12 and places the cable head unit 72c above the cable head unit 72b and away from the leader line 12 before the cable head unit 72b.

The power receiving line 21a comprises breaker units 74a to 74c which are disposed between the main busbars 1 and 2 to be perpendicular to the main busbar 1 and horizontally along the main busbar 1. The breaker units 74a to 74c are provided along with a breaker unit 51a of the busbar connecting line 3a and horizontally as the breaker unit 51a is provided. The breaker units 74a to 74c comprise a breaker section 76a and an operator 77a. The breaker section 76a and the operator 77a are built up in the same manner as those of the breaker units 51a to 51c.

The enclosure of a cylindrical tank constituting the breaker section 76a of the breaker unit 74a has a busbar connecting unit 78a on one end of the enclosure by means of a current transformer unit 80 and a busbar connecting unit 79a on the other end of the enclosure by means of a current transformer unit 81. The current transformer unit 80 accommodates a current transformer 23a in the cylindrical tank and the current transformer unit 81 accommodates a current transformer 24a in the cylindrical tank.

The enclosure of a cylindrical tank constituting the breaker section 76a of the breaker unit 74b has a busbar connecting unit 78b on one end of the enclosure by means of a current transformer unit 80 and a busbar connecting unit 79b on the other end of the enclosure by means of a current transformer unit 81. The enclosure of a cylindrical tank constituting the breaker section 76a of the breaker unit 74c has a busbar connecting unit 78c on one end of the enclosure by means of a current transformer unit 80 and a busbar connecting unit 79c on the other end of the enclosure by means of a current transformer unit 81.

Each of the busbar connecting units 78a to 78c has a disconnecting switch 25a, a grounding switch 26a, and a connecting busbar in a cylindrical tank and stands upright on one end of the enclosure of the tank. The busbar units 68a to 68c constituting the main bus bar 1 and the busbar connecting units 78a to 78c are across the busbar connecting units 78a to 78c. The busbar units 68a to 68c are disposed vertically along the busbar connecting units 78a to 78c. The busbar connecting units 78a is connected to the busbar unit 68a. The busbar connecting units 78b is connected to the busbar unit 68b. Similarly, the busbar connecting units 78c is connected to the busbar unit 68c.

Each of the busbar connecting units 79a to 79c has a disconnecting switch 27a, a grounding switch 28a, and a connecting busbar in a cylindrical tank and stands upright on the other end of the enclosure of the tank.

The busbar units 68a to 68c constituting the main bus bar 1 and the busbar connecting units 79a to 79c are across the busbar connecting units 78a to 78c. The busbar units 68a to 68c are disposed vertically along the busbar connecting units 79a to 79c. The busbar connecting units 79a is connected to the busbar unit 68a. The busbar connecting units 79b is connected to the busbar unit 68b. Similarly, the busbar connecting units 79c is connected to the busbar unit 68c.

The power receiving line 21b comprises the breaker units 75a to 75c which are disposed between the main busbars 1 and 2 so as to be perpendicular to the main busbar 2 and horizontally along the main busbar 2. The breaker units 75a to 75c are provided along with the breaker unit 51c of the busbar connecting line 3a and horizontally as the breaker unit 51c does. The breaker units 75a to 75c are respectively composed of a breaker section 76b and the operator 77b which are the same as those of the breaker units 51a to 51c.

The enclosure of the cylindrical tank constituting the breaker section 76b of the breaker unit 75a has a busbar connecting unit 82a on one end of the tank enclosure by means of the current transformer 84 and a busbar connecting unit 83a on the other end of the tank enclosure by means of the current transformer 85. The current transformer 84 has a current transformer 23b in the cylindrical tank and the current transformer 85 has a current transformer 24b in the cylindrical tank. The enclosure of the cylindrical tank constituting the breaker section 76b of the breaker unit 75b has a busbar connecting unit 82b on one end of the tank enclosure by means of the current transformer 84 and a busbar connecting unit 83b on the other end of the tank enclosure by means of the current transformer 85.

The enclosure of the cylindrical tank constituting the breaker section 76b of the breaker unit 75c has a busbar connecting unit 82c on one end of the tank enclosure by means of the current transformer 84 and a busbar connecting unit 83c on the other end of the tank enclosure by means of the current transformer 85.

Each of the busbar connecting units 82a to 82c has a disconnecting switch 25b, a grounding switch 26b, and a connecting busbar in a cylindrical tank and stands upright on one end of the enclosure of the tank. The busbar units 69a to 69c constituting the main bus bar 2 and the busbar connecting units 82a to 82c are across the busbar connecting units 83a to 83c. The busbar units 69a to 69c are disposed vertically along the busbar connecting units 82a to 82c. The busbar connecting units 82a is connected to the busbar unit 69a. The busbar connecting units 82b is connected to the busbar unit 69b. Similarly, the busbar connecting units 82c is connected to the busbar unit 69c.

Each of the busbar connecting units 83a to 83c has a disconnecting switch 27b, a grounding switch 28b, and a connecting busbar in a cylindrical tank and stands upright on the other end of the enclosure of the tank. The busbar units 69a to 69c constituting the main bus bar 2 and the busbar connecting units 82a to 82c are across the busbar connecting units 83a to 83c. The busbar units 69a to 69c are disposed vertically along the busbar connecting units 83a to 83c. The busbar connecting units 83a is connected to the busbar unit 69a. The busbar connecting units 83b is connected to the busbar unit 69b. Similarly, the busbar connecting units 83c is connected to the busbar unit 69c.

The busbar partitioning lines 29a and 29b are connected to the main busbars of an adjoining gas-insulated switching device and built up almost in the same manner as the power receiving lines 21a and 21b. Therefore, identical reference numerals are assigned to units constituting the busbar partitioning lines 29a and 29b and to units constituting the power receiving lines 21a and 21b in the drawings and part of the description is omitted.

A cylindrical tank constituting each of the connecting busbar units 78a to 78c of the busbar partitioning line 29a contains a disconnecting switch 35a, a grounding switch 36a, and a connecting busbar in it. The cylindrical tank constituting the current transformer unit 80 of the busbar partitioning line 29a contains a current transformer 32a. A cross-shaped branch type tank constituting each of the connecting busbar unit 79a to 79c of the busbar partitioning line 29a contains a disconnecting switch 33a, grounding switches 34a and 37a, and a connecting busbar in it. A transformer unit 86 containing a transformer 38a in a cylindrical tank is connected to the cross-shaped branch type tank constituting the connecting busbar units 79a to 79c of the busbar partitioning line 29a at the side opposite to the side on which the connecting busbar units 78a to 78c exist. The current transformer unit 81 of the busbar partitioning line 29a contains a current transformer 32a in a cylindrical tank.

A cylindrical tank constituting each of the connecting busbar units 82a to 82c of the busbar partitioning line 29b contains a disconnecting switch 35b, a grounding switch 36b, and a connecting busbar in it. The cylindrical tank constituting the current transformer unit 84 of the busbar partitioning line 29b contains a current transformer 32b. A cross-shaped branch type tank constituting each of the connecting busbar unit 83a to 83c of the busbar partitioning line 29b contains a disconnecting switch 33b, grounding switches 34b and 37b, and a connecting busbar in it. A transformer unit 87 containing a transformer 38b in a cylindrical tank is connected to the cross-shaped branch type tank constituting the connecting busbar units 82a to 82c of the busbar partitioning line 29b at the side opposite to the side on which the connecting busbar units 82a to 82c exist. The current transformer unit 85 of the busbar partitioning line 29b contains a current transformer 31b in a cylindrical tank.

Judging from the above description, this embodiment builds up the busbar connecting lines 3a to 3c with horizontal breaker units 51a to 51c and consequently can reduce the physical installation height of the gas-insulated switching device.

Further, this embodiment can reduce the distance between the main busbars 1 and 2 of the gas-insulated switching device as the busbar units 68a to 68c constituting the main busbar 1 are vertically disposed along the busbar connecting units 66a to 66c and the busbar units 69a to 69c constituting the main busbar 2 are vertically disposed along the busbar connecting units 67a to 67c. Therefore, this embodiment reduces the installation space while suppressing the installation height of the gas-insulated switching device.

Further, this embodiment connects the breaker units 51a and 51b with the breaker connecting units 52a having the upright sections 55a and 56a and the breaker units 51b and 51c with the breaker connecting units 52b having the upright sections 55b and 56b and consequently can reduce the lengths of the horizontal sections 57a and 57b which constitute the breaker connecting units 52a and 42b and the lengths between the main busbars 1 and 2 of the gas-insulated switching device. Therefore, this embodiment can reduce the dimensions between the main busbars of the gas-insulated switching device and consequently reduce the physical installation area of the gas-insulated switching device.

Furthermore, this embodiment draws out leader lines 13 and 14 from a single point on the horizontal section 57b of the breaker connecting unit 52b and draws out the connecting busbar unit 70c of the leader line 14 slantwise along the main busbar 2 and horizontally apart from the connecting busbar unit 70b of the leader line 13. As the result, this embodiment can draws out the leader lines 13 and 14 from a single point on the horizontal section 57b of the horizontal section 52b without increasing the dimensions of the horizontal section 57b which constitutes the breaker connecting unit 52b. Therefore, even when two leader lines are drawn from a single point on the horizontal section of the breaker connecting unit, it never happens that the distance between the main busbars 1 and 2 of the gas-insulated switching device increases and that the physical installation space of the gas-insulated switching device increases.

Although, in the above description, this embodiment draws out the connecting busbar unit 70c of the leader line 14 slantwise along the main busbar 2 and apart from the connecting busbar unit 70b of the leader line 13, it is possible that the connecting busbar unit 70c is first drawn out in parallel to the main busbar 2, and then at right angles to the main bus bars 1 and 2. In this case, the connecting busbars can be made shorter when drawn out slantwise. Further, it is possible to draw out the connecting busbar unit 70c of the leader line 14 (which is connected to the single phase lines 50a to 50c) between phases of the busbar connecting lines 3a to 3c (or between the single-phase lines 50a and 50b and between the single-phase lines 50b and 50c). For example, the connecting busbar unit 70c of the leader line 14 which is connected to the single phase line 50a can be drawn between the single-phase lines 50a and 50b and the connecting busbar unit 70c of the leader line 14 which is connected to the single phase lines 50b and 50c can be drawn between the single-phase lines 50b and 50c.

Further, this embodiment disposes the transformer unit 64 connected to the upright section 55a of the breaker connecting unit 52a in a space between the upright section 55a and the busbar connecting units 66a to 66c and the transformer unit 65 connected to the upright section 55b of the breaker connecting unit 52b in a space between the upright section 55b and the busbar connecting units 67a to 67c. Consequently, this embodiment can suppress the transformer units 64 and 65 from increasing the installation height of the gas-insulated switching device.

(Embodiment 2)

Figure 6:
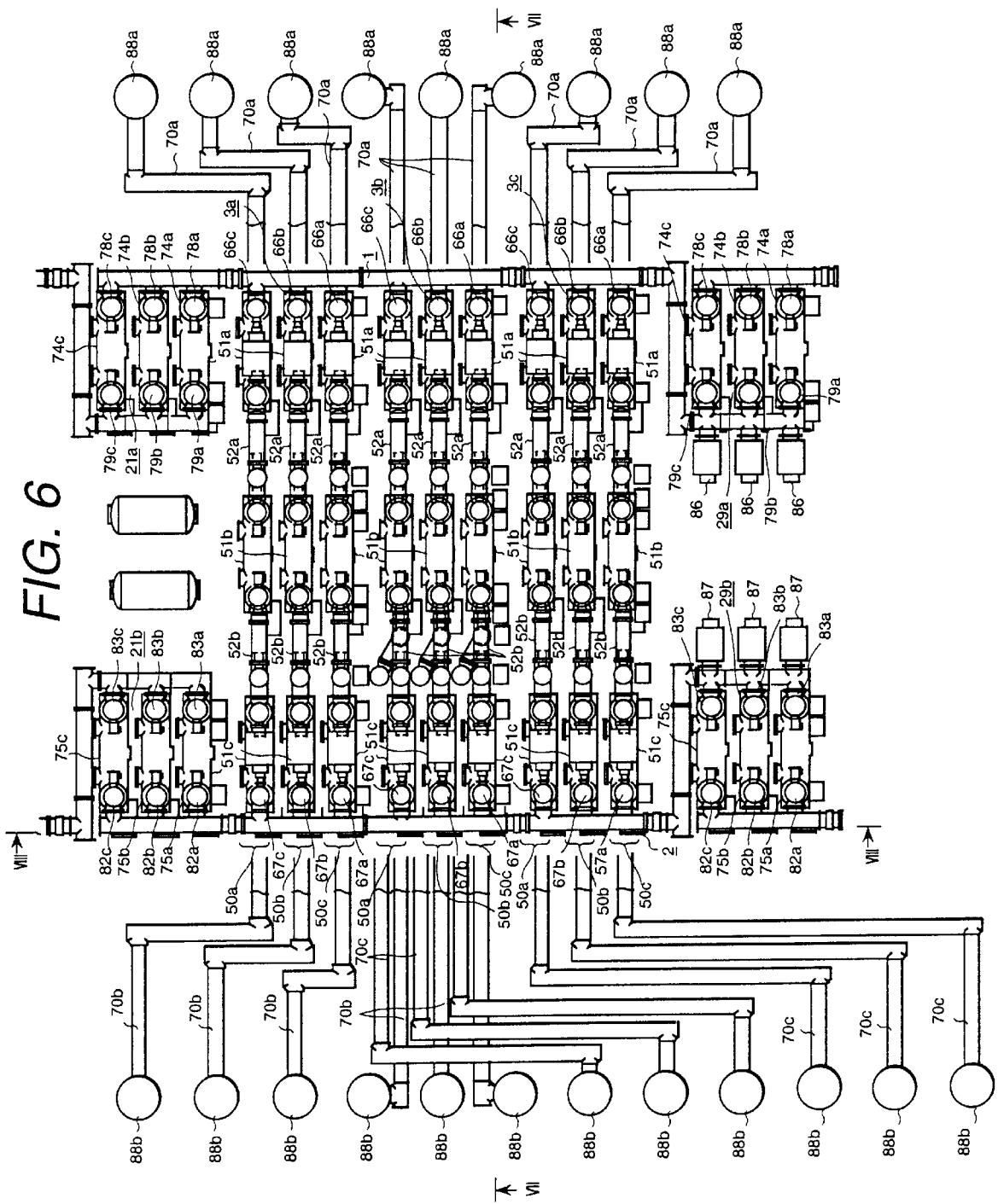
FIG. 6 is a plan view of the component layout of a gas-insulated switching device which is a second embodiment of the present invention.
Figure 7:
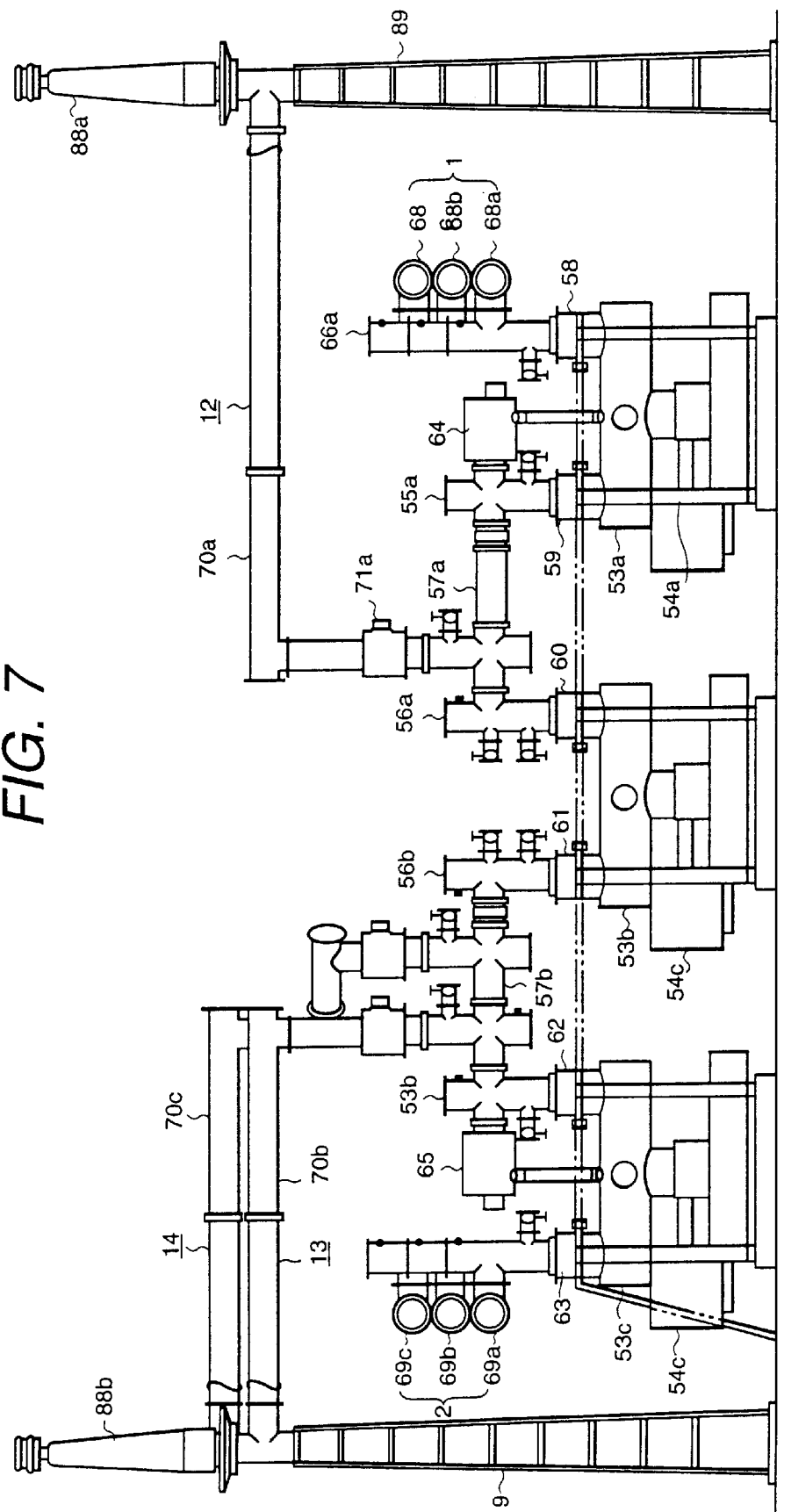
FIG. 7 is a plan view taken on line VII—VII of FIG. 6.
Figure 8:
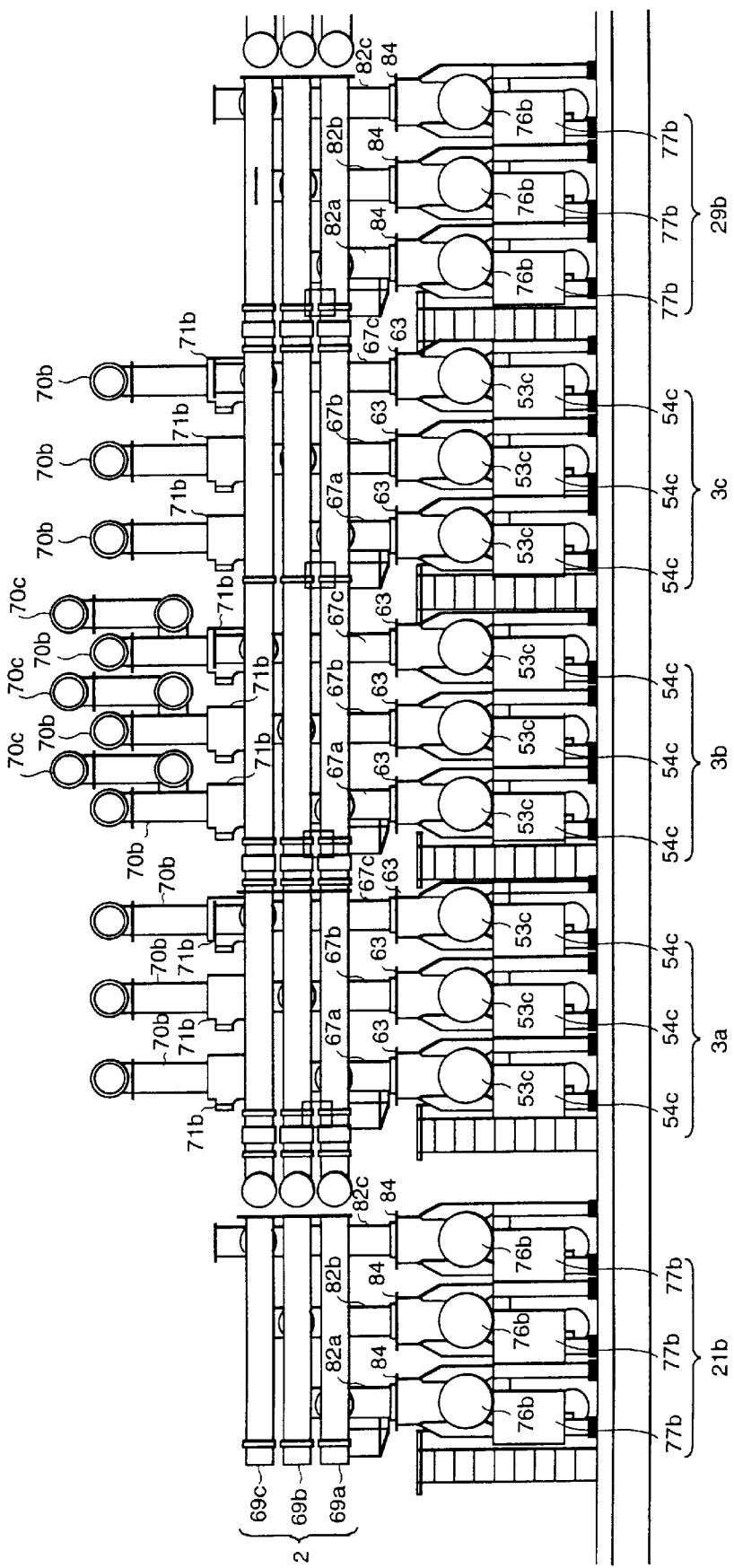
FIG. 8 is a plan view taken on line VIII—VIII of FIG. 6.

Referring to FIG. 6 to FIG. 8, a second embodiment of the present invention will be explained below. FIG. 6 to FIG. 8 show the component layouts of a gas-insulated switching device which is a second embodiment of the present invention. This embodiment is an improvement of the first embodiment.

The main busbars 1 and 2, the busbar connecting lines 3a to 3c, the power receiving lines 21a and 21b and the busbar partitioning lines 29a and 29b of this embodiment are built up in the same manner as those of the first embodiment. Therefore, identical reference numerals are assigned to them in the drawings and part of the description is omitted. The gas-insulated switching device of the second embodiment is installed in an outdoor substation and sends power to a downstream power system through bushings. Therefore, the configuration of the leader lines 12 to 14 of this embodiment is different from that of the first embodiment.

The leader line 12 comprises a connecting busbar unit 70a, a current transformer unit 71a, and a bushing 88a. The connecting busbar unit 70a is connected to a cross-shaped branch type tank which constitutes the horizontal section 57a of the breaker connecting unit 52a via the current transformer unit 71a, stands upright, bends at right angle towards the busbar 1, extends horizontally, and reaches to the bushing 88a on a steel tower at the main busbar 1 side.

The leader line 13 comprises a connecting busbar unit 70b, a current transformer unit 71b, and a bushing 88b. The connecting busbar unit 70b is connected to a cross-shaped branch type tank which constitutes the horizontal section 57b of the breaker connecting unit 52b via the current transformer unit 71b, stands upright, bends at right angle towards the busbar 2, extends horizontally, and reaches to the bushing 88a on a steel tower at the main busbar 2 side.

The leader line 14 comprises a connecting busbar unit 70c, a current transformer unit 71c, and a bushing 88c. The connecting busbar unit 70c is connected to the cross-shaped branch tank (different from the cross-shaped branch tank to which the connecting busbar unit 70b is connected via a current transformer unit 71b) which constitutes the horizontal section 57b of the breaker connection unit 52b of the busbar connecting line 3b. The connecting busbar unit 70c is drawn slantwise along the main busbar 2 and horizontally to the side of the connecting busbar unit 70b and rises upright along the connecting busbar unit 70b.

In this case, the connecting busbar unit 70c is above the connecting busbar unit 70b. Then the connecting busbar unit 70c bends at right angle towards the busbar 2, extends horizontally, and reaches the bushing 88c on a steel tower at the main busbar 2 side.

As explained above, the second embodiment draws out the connecting busbar unit 70c slantwise along the main busbar 2 and horizontally to the side of the connecting busbar unit 70b and rises it upright along the connecting busbar unit 70b. Consequently, even when both the leader lines 13 and 14 are drawn out from a single point on the horizontal section 57b of the breaker connecting unit 52b, the leader lines 13 and 14 can be drawn in the same direction. It is also possible to horizontally draw the connecting busbar unit 70c in parallel to the main busbar 2 and to horizontally draw it perpendicularly to the line connecting the ain busbars 1 and 2.

Further, this embodiment places the connecting busbar unit 70c above the connecting busbar unit 70b, bends it at a right angle towards the main busbar 2, and extends it horizontally. When the connecting busbar units 70b and 70c are placed side by side horizontally, it is necessary to widen the phase-to-phase distances of the single-phase lines 50a to 50c which constitutes the busbar connecting line 3b to secure the insulating distance between the connecting busbar units 70b and 70c. This unwontedly increases the installation space of the gas-insulated switching device. However, as the connecting busbar unit 70c is placed above the connecting busbar unit 70b, this embodiment can secure the insulating distance between the connecting busbar units 70b and 70c without increasing the phase-to-phase distances of the single-phase lines 50a to 50c constituting the busbar connecting line 3b. The other parts of this embodiment equivalent to those of the first embodiment have the same effects as those of the first embodiment.

FIELD OF THE INVENTION

The present invention is applicable to a gas-insulated switching device whose installation height and space are limited, particularly to a gas-insulated switching device to be installed in an electric station such as an indoor substation or an underground substation where the physical spaces for installation are limited.

What is claimed is:

1. A gas-insulated switching device comprising:

a pair of main busbars which are disposed in parallel to each other, three-phase busbar connecting lines which are disposed perpendicularly to and between said main busbars for connection; and leader lines which are connected to said busbar connecting lines, wherein said busbar connecting lines are arranged along said main busbar and each phase thereof comprises horizontal breaker units serially connected to each other through breaker connecting units in a straight line, each of said main busbars has three busbar units arranged in parallel to each other and vertically along busbar connecting units which stand upright, two of said leader lines are led out from one of said breaker connecting units, and one of said two leader lines has a connecting busbar unit constituting said one leader line, said connecting busbar unit being led out horizontally from said one breaker connecting unit toward one side of a connecting busbar unit constituting the other of said two leader lines so as to be slantwise to an extending direction of said main busbars.

2. A gas-insulated switching device comprising a pair of main busbars which are disposed in parallel to each other, busbar connecting lines which are disposed perpendicularly to and between said main busbars for connection, and leader lines which are connected to said busbar connecting lines, wherein said busbar connecting lines comprise three horizontal breaker units connected through breaker connecting units in a straight line, each of said main busbars has three busbar units along busbar connecting units which stand upright, two of said leader lines are led out downward from one or said breaker connecting units, and one of said two leader lines has a connecting busbar unit constituting said one leader line, a first portion of said connecting busbar unit being parallel to said main busbars, and a second portion of said connecting busbar unit extending perpendicularly to an opposite direction between said main busbars opposite to each other from said first portion.

3. A gas-insulated switching device as claimed in claim 1, where in said breaker units are connected to each other with said breaker connecting units through upright sections of said breaker connecting units raised upright from ends of said breaker units.

4. A gas-insulated switching device as claimed in claim 1, wherein said main busbars are placed on the portions standing upright from ends of each of said busbar connecting lines at either first sides of said portions facing to said main busbars or second sides opposites to said first sides.

5. A gas-insulated switching device as claimed in claim 2, wherein each of said main busbars is placed on a respective portion of one of said breaker units standing upright from one end of one of said connecting lines at either the side facing to one of said main busbars or the other side thereof.

6. A gas-insulated switching device as claimed in claim 1, wherein said one leader line is led out vertically from said one breaker connecting unit and the other one of said two leader lines is led out horizontally towards the side of the other one of said two leader lines.

7. A gas-insulated switching device as claimed in claim 1, wherein said one leader line is led out vertically from said one breaker connecting unit and the other one of said two leader lines is led out horizontally between phases of said busbar connecting lines.

8. A gas-insulated switching device as claimed in claim 1, wherein a transformer unit to be connected between two adjacent breaker units is placed in a space between busbar units standing upright from both ends of said breaker unit.

9. A gas-insulated switching device comprising a pair of main busbar arranged in parallel to each other, three-phase busbar connecting lines disposed perpendicularly to and between said main busbars and connecting between said main busbars, and leader lines connected to said busbar connecting lines, wherein said busbar connecting lines for three phases are arranged along said main busbars and each comprise three horizontal breaker units serially connected to each other through breaker connecting units in a straight lines, each of said main busbars has three busbar units arranged in parallel to each other and vertically along busbar connecting units which stand upright, said leader lines each comprises a connecting busbar unit, a current transformer unit and a bushing, and said leader lines are formed so that one end of said connecting busbar unit is connected to a cross-shaped branch type tank constituting a horizontal portion of one of said breaker connecting units through said current transformer unit, the other end of said connecting busbar unit is connected to said bushing and a portion between said one end and said other end of said connecting busbar unit is extended upright from said one end thereof, bent toward one of said main busbars and horizontally extended from the bent portion to said bushing.

10. A gas-insulated switching device according to claim 9, wherein one of said connecting busbar units is slanted along said main busbars and led out horizontally toward a side of another connecting busbar unit adjacent said one connecting busbar unit, and raised along said another connecting busbar unit.

11. A gas-insulated switching device according to claim 9, wherein said one connecting busbar unit is raised to a position higher than said another connecting busbar unit.

* * * * *